UNITED STATES PATENT OFFICE.

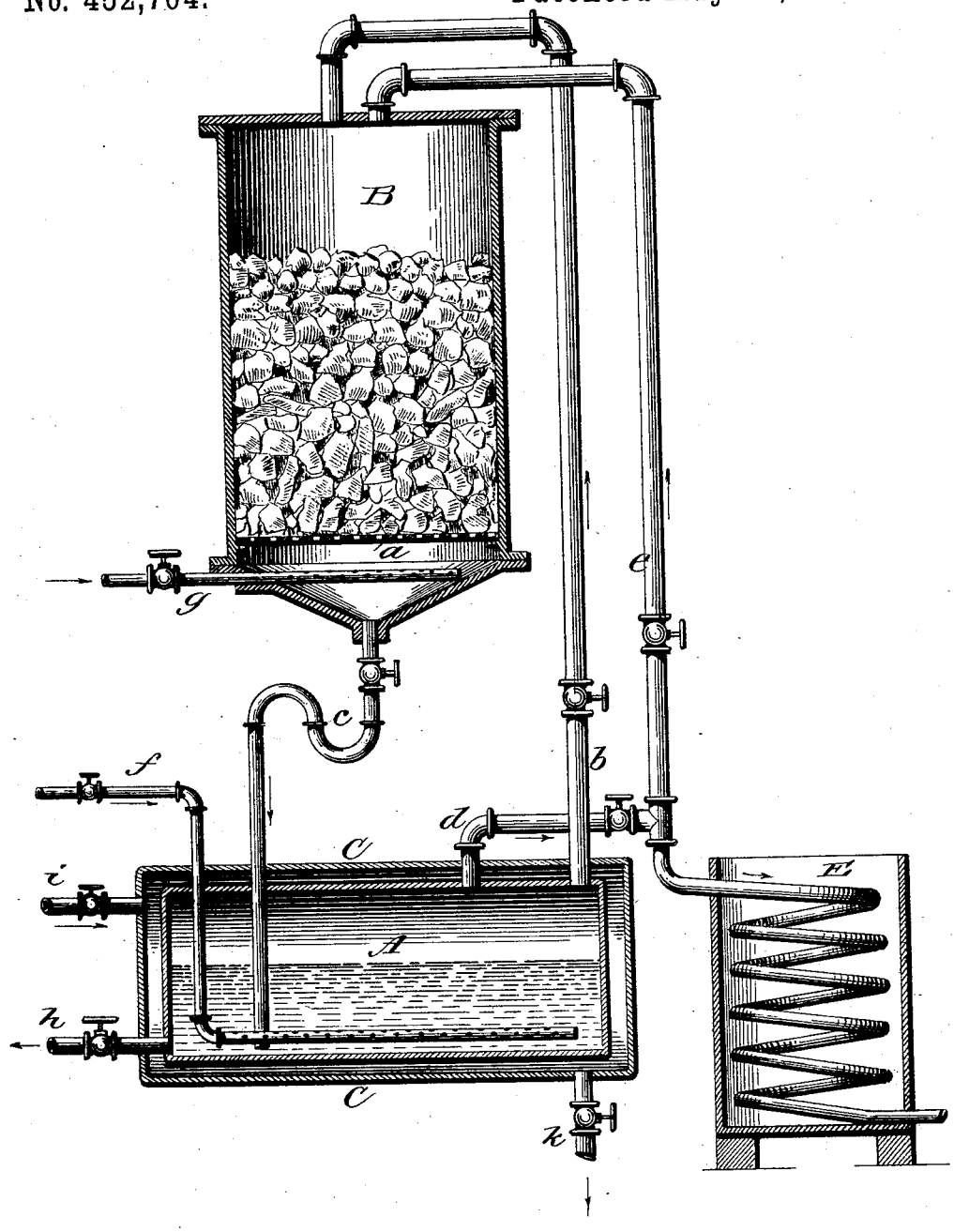

FREDERICK SALATHÉ, OF JERSEY CITY, NEW JERSEY, ASSIGNOR, BY MESNE ASSIGNMENTS, TO THE LITHO-CARBON COMPANY, OF NEW YORK, N. Y.

HYDROCARBON PRODUCT.

SPECIFICATION forming part of Letters Patent No. 452,764, dated May 19, 1891.

Application filed March 6, 1891. Serial No. 383,942. (No specimens.)

*To all whom it may concern:*

Be it known that I, FREDERICK SALATHÉ, a citizen of the United States, residing in Jersey City, in the county of Hudson and State of New Jersey, have invented a new and useful Hydrocarbon Product and Method of Producing the Same, of which the following is a specification.

The hydrocarbon product in which my invention is comprised is of great utility in many and various branches of the industrial arts—e. g., for insulating purposes—as a substitute for rubber or gutta percha, or for amalgamation with rubber, for waterproofing textile fabrics, leather, wood fiber, &c.; in the manufacture of paints, varnishes, and japans, &c., as a lining for barrels, casks, and other hollow bodies—such, for example, as tanks for holding acids, for which its resistance to acids fits it admirably—for use in paving compositions and building materials, and in sheet form as roofing material, in which case it can be overlaid on one or both faces with paper or textile material, as customary now in the use of plastics for roofing, as a saturant or coating for bricks and the like, as a coating for leather to produce what is conventionally termed "patent leather," as a strengthening and waterproofing substance for hydraulic hose or belting of fabric or other material, and generally for use in any connection where the services of an insulating, water-proof, or acid-proof material is required, either alone or in combination with other ingredients. It is a resinoid hydrocarbon product. An analysis of the product gives the following results: carbon, 88.23; hydrogen, 11.59; oxygen, .06; sulphur, trace. The product is a solid material devoid of stickiness or viscousness, of a jet-black color, flexible and somewhat plastic at ordinary temperature, of high gloss, and of great toughness. In flexibility and toughness it indeed resembles india-rubber, but lacks the degree of elasticity of the latter. Its specific gravity is about 1.028—that is to say, from 1.000 to 1.028. It fractures only at low temperatures, when it will show a slight conchoidal fracture. It is soluble in naphtha, benzole, chloroform, bisulphide of carbon, partially in ether, completely in turpentine, rosin-oils, &c. It is not sensitive to sunlight. It will stand a temperature of 600° Fahrenheit without giving off dissociated products. It resists acids and alkalies except concentrated nitric and concentrated sulphuric acids. It amalgamates perfectly with rubber and shows signs of vulcanization when in combination with rubber. Thus in very many of its physical characteristics, particularly those which invest it with its peculiar value for industrial uses, it is essentially different and distinguishable from asphaltum, maltha, or bitumen.

The product differs from the substances just named not only in the respects last noted but in chemical constitution as well. So far as I have been able to determine it is not to be classed with such bodies as asphalts, &c., nor does it belong to the olefine or paraffine series to which the latter belong. From the analysis above stated it is manifest that the product has the formula $C_{10}H_{16}$, which is the one for all terpenes, and it is my belief from what investigations I have made that it is one of the higher polymeric members of the terpene series.

I obtain the product by the suitable treatment of a natural substance found in large quantities in the State of Texas, this substance being a hydrocarbon material contained in or combined with sand or shell rock. This material, separated from the lime or sand rock and in its natural state, analyzes as follows: carbon, 87.40; hydrogen, 12.00; sulphur, .09; oxygen, traces.

Comparison of the analysis of the natural substance with that of the artificial hydrocarbon product of my invention will establish material differences between the two, particularly as to the sulphur and oxygen constituents. The natural substance has no oxygen practically and a noticeable percentage of sulphur. Were these characteristics in the product they would injuriously affect it. The absence of oxygen would take from the product its toughness and elasticity. The presence of sulphur would unfit the product for use, for example, in paints, owing to its liability under these circumstances to evolve sulphureted gases, thus causing spongy porous films and blisters. The natural substance, moreover, taken from the sand or shell rock is not a solid, but is, on the contrary, a semi-liquid, highly sticky, dark brown, or black product which does not solidify, but is permanently viscous and has no drying qualities whatever. This latter objectionable characteristic is due, as I have discovered, to the fact that one of the constituents of the natural substance is a volatile oil which amounts to from one-fourth to one per cent. of the said natural substance. In order to obtain my new product from this crude material I employ a process which involves three steps, viz: first, separating the crude hydrocarbon from the sand or shell rock by means of a solvent, then evaporating or driving off the solvent, and, thirdly, treating the remaining hydrocarbon with steam or hot air, or both, whereby the volatile constituent and the sulphur hereinbefore referred to are driven off and the hydrocarbon is caused to absorb the needed proportion of oxygen. In this process I may use any suitable solvents, such as petroleum, naphtha, benzole, bisulphide carbon, turpentine, &c. I prefer petroleum naphtha owing to its cheapness and to the ease with which it can be recovered without considerable loss.

The following is a description of an apparatus suitable for carrying out the process, reference being had to the accompanying drawing, which represents in side sectional elevation so much of said apparatus as required for an understanding of the manner in which the process may be carried out. It will of course be understood that this apparatus is merely typical of a variety of appliances which might be used, and that I do not limit myself to any particular construction of apparatus.

A is a tank for holding the solvent.

B is a vessel for holding the rock reduced to fragments of any desired size. Vessel B has a perforated false bottom $a$. E represents a condensing-vessel with condensing-coil.

$b$ is the vapor-pipe conducting the solvent in a vapor form to the rock in vessel B; $c$, trap-pipe conveying the extract to the bottom of tank A; C, steam-jacket around tank A, with steam-inlet $i$ and steam-outlet K.

$d$ is exit vapor-pipe leading to condenser E, opened when solvent is to be distilled off from the extracted hydrocarbon in tank A; $e$, vapor-pipe to be opened after extraction when live steam is introduced into chamber B through perforated pipe $g$, carrying steam and last traces of naphtha held in the rock to condenser E.

$f$ is a steam-pipe running along the bottom of tank A, where it is perforated. $h$ is outlet-valve for the finished artificial product, which can thence be drawn in a molten state into suitable receptacles.

All of the pipes are of course provided with suitable cocks, as indicated.

The operation of extraction is as follows: Tank A receives the solvent, conveniently naphtha, while cylinder B is filled with the ground or crushed rock resting on perforated bottom $a$. Steam is turned on in steam-jacket C, causing the naphtha to boil and send its vapors through pipe $b$ into chamber B, where they condense in the fragments of rock and exert the dissolving effect on the latter, eliminating or carrying down in solution the native hydrocarbon through pipe $c$ to bottom of vessel A. During this time condenser E is shut off from tank A and chamber B. After extraction is complete—that is, when the liquor running from tube $c$ is almost colorless or is but naphtha—pipes $b$ and $c$ are shut off from B, and tank A is now connected with condenser E through pipe $d$. Said condenser communicates also with chamber B by pipe $e$. The steam-heat from jacket C causes now the naphtha to distill off from the hydrocarbon, and said naphtha is recovered through condensation in coil of vessel or water-tank E. At the same time steam is turned into pipe (perforated) $g$, whereby all the adhering naphtha is driven off from the rock and condensed in condenser E, the naphtha there rising to the top of the condensed water. When the naphtha has stopped running from tank A, heated by steam-jacket C, dry steam or hot air is introduced through pipe $f$ and rises through the heated and still molten hydrocarbon, carrying with it the last traces of naphtha and a volatile oil of specific gravity .835. This oil carries with it most of the sulpher contained in the native substance, while small quantities of sulphur are also visible in the milky water condensing in E. As soon as the steam or hot air ceases to carry over any more of this volatile oil, (the quantity of which is from one-fourth to one per cent. of the native product,) and the condensing water is clear, the steam from pipe $f$ is stopped and the hydrocarbon product, which has thus been produced is allowed to run into suitable receptacles where it can solidify.

An absorption of oxygen takes place while eliminating the volatile oil, especially at the last stage of running open steam or a current of hot air into and through the heated product. It is to this action that the proportion of oxygen above shown to be present in the product is due. The temperature of the hot air should be somewhat higher than that of the molten product.

Having now described my invention and the best way now known to me of carrying the same into effect, what I believe herein to be new and of my invention is as follows:

1. As a new manufacture, the described hydrocarbon product, member of the $C_{10}H_{16}$ series, the same being a solid material, with a specific gravity of about 1.028, tough and of a glossy jet-black color, flexible and somewhat plastic at ordinary temperature, soluble in naphtha, turpentine, and other solvents before named, capable of withstanding a temperature of 600° Fahrenheit, resisting acids and alkalies, excepting concentrated nitric and concentrated sulphuric acids, and amalgamating with rubber, substantially as hereinbefore set forth.

2. The method of producing the material hereinbefore described, which consists in first separating the crude natural substance from the sand or other mineral by means of a solvent, then separating or driving off the solvent from the crude material thus obtained, and finally injecting steam or hot air into the said crude material in order to drive off the sulphur and volatile oil constituents of the material, and also to supply the latter with oxygen, substantially as and for the purposes hereinbefore set forth.

In testimony whereof I affix my signature in presence of two witnesses.

FREDERICK SALATHÉ.

Witnesses:
 AMOS ROGERS,
 FREDERICK F. CULVER.